Patented Jan. 1, 1935

1,986,571

UNITED STATES PATENT OFFICE 1,986,571

MODIFIED DRYING OIL AND PROCESS OF MAKING

Henry A. Gardner, Washington, D. C.

No Drawing. Application February 15, 1934, Serial No. 711,442

12 Claims. (Cl. 87—12)

This invention relates to the provision of a modified oil of vegetable or animal origin, said oil having properties which markedly differ from those of the untreated oil.

U. S. Patents Nos. 1,384,447, 1,412,399, 1,452,553 and 1,463,884 to Henry A. Gardner indicate how chlorine may enter the molecule of an oil and then be removed therefrom, whereby to cause certain fundamental changes in the oil. Such treatment may improve the drying characteristics or cause other phenomena of a desirable nature.

It has now been found that such substances as sulphur and selenium, either in their native state or preferably in an organic form, may be caused to enter the molecule of an oil of vegetable or animal (e. g., marine) origin, in relatively very small amount, and subsequently be removed from the oil through certain physical and chemical treatments, whereby to work desirable changes in the oil. This sulphurization and subsequent desulphurization apparently accomplish changes in the oil somewhat analogous to those produced by chlorination and subsequent dechlorination of oil. While selenium is an equivalent of sulphur in the present relation, the former is a dangerous poison which could be employed only with great difficulty. Moreover, it is considerably more expensive than sulphur. For these reasons I prefer to employ sulphur as the reactant.

While I may use elemental sulphur in the process, I prefer to use an organic form of that element. Thus, I find that a very wide variety of organic compounds of sulphur may be used. For instance, mercaptobenzothiazole has proved quite efficient for the purpose. The reaction products of sulphur with various solvents, such as turpentine, or rosin, also are included. Ammonium sulpho cyanate is operable. I prefer, however, to start with a base reactant prepared by dissolving and reacting the sulphur with an organic substance such as chlorinated diphenyl, which latter appears to be a very remarkable solvent for sulphur.

As an example, 100 grams of chlorinated diphenyl is heated with 20 grams of sulphur at a temperature of about 200° C. The reaction is continued until a perfectly clear liquid results. Upon cooling the reaction product, the same usually forms a hard mass which may be broken up into small pieces. I ordinarily employ this product as my organic sulphur base.

Another very useful sulphur base may be prepared as follows: Turpentine and flowers of sulphur, in about the proportion of 10 to 1, are heated at a temperature somewhat below the boiling point of the turpentine, whereupon the sulphur dissolves in and reacts with the turpentine; the reaction mixture is then cooled to about 150° C. and ordinary rosin, in an amount corresponding to the amount of turpentine used or even to twice that amount, is added and dissolved therein. Finally, the mass is cooled to a solid, and thereafter broken up into suitably sized fragments.

I have found that such sulphur-containing organic compounds as blacken white lead when heated therewith are operable in the present relation as sulphurizing agents for the sulphurization of a drying or semi-drying oil.

Illustrative of my process of treating oils, the following is given:

100 grams of a suitable drying oil, such, for example, as tung oil, is placed in a kettle and there is added .05 gram of flowers of sulphur, or an equivalent quantity of an organic compound of sulphur, such as the sulphurized chlorinated-diphenyl base referred to above. The oil is quickly brought up to a temperature of 290° C. (554° F.), during which time it becomes "bodied" and the sulphur enters into reaction therewith. At the temperature of 290° C. there is added from about 1 to about 5 grams of a desulphurizing material such as sponge copper, finely divided oxides of lead, zinc or copper, or of other products which will remove the sulphur from the oil molecule. These desulphurizing agents are usually wetted with a small amount of oil before they are added to the sulphurized oil mixture. They are then stirred into the sulphurized oil and at the high temperature referred to (554° F.), react with the sulphur. When metallic oxides are employed as desulphurizing agents, they produce corresponding sulphides—black sulphide of lead being produced where litharge is used, black copper sulphide being produced where copper oxide is used, and white sulphide of zinc being produced where zinc oxide is employed. In place of these materials, I may use finely divided copper, zinc, iron, nickel or Monel metal, or spun copper or other suitable heavy metal presenting extended surfaces, which react most readily with the oil. Bright copper surfaces, for instance, almost immediately become black. Only a few minutes heating at the above temperature is required for the desired reaction, substantially all of the sulphur being removed. The oil is then cooled. If desired, it may be filter-pressed (to remove the small amount of pigment present), or may be filtered to remove the metallic copper or other metal. The oil is then ready to employ. If copper sponge, or other suitable metallic sponge having an affinity for sulphur, is employed it may simply be dipped into the kettle of hot sulphurized oil and thereafter withdrawn therefrom in toto, thus obviating filtration or filter-pressing.

By the above treatment, tung oil for instance, will be reduced in iodine number from 170 to about 125. Its specific gravity will be approximately 0.98. Its refractive index will be approximately 1.500. Its viscosity will be approximately Z4 to Z5 on the Gardner-Holt viscometer scale.

Unsaturated glycerides contain either isolated or conjugated double bonds, and their drying time depends to a great extent upon the position of these bonds. Thus a rearrangement of the bonds by migration from an isolated to a conjugated position makes the glyceride dry more rapidly and more nearly like tung oil. In the latter oil there are three unsaturated conjugated valences, thus explaining its quick drying and jelling properties. Unfortunately, however, tung oil dries to such hard films throughout that brittleness develops. This quick drying and complete hardening ultimately cause shrinkage phenomena and loss of elasticity, and peeling and flaking may ultimately result. Moreover, the initial drying of tung oil is of such intensity that the outer skin of film wrinkles and gives a frosted or dull or checked appearance rather than a high gloss. This phenomenon is aggravated in the presence of carbon monoxide gas from baking and drying ovens, and one of the great problems of the industry has been to produce tung oil containing coating compositions which are absolutely free from frosting.

It is believed that by my new process of sulphurization and desulphurization at least one of the valences in an animal or vegetable oil having at least one double bond is partially satisfied, and it is probable that all of the complexes migrate to even more closely conjugated positions. Whatever may be the correct explanation, it is a fact that most highly colloidal complexes of great molecular magnitude are formed, and that these have a very remarkable dispersing action upon pigments. The reaction product of as low as one percent of a finely divided pigment like zinc oxide, when used as a desulphurizing agent in my process, becomes so permanently dispersed that it apparently never settles out of suspension; a stable, slightly cloudy, liquid composition being formed.

The sulphurized oil, before desulphurization thereof, when heated with a metal such as copper or iron, quickly darkens that metal; however, after being desulphurized in accordance with the process above described, it may be heated with a metal for a long period without darkening the metal. Also, when white lead is heated with the sulphurized oil the white lead turns black, but when heated with the desulphurized oil remains uncolored. Moreover, analysis of the desulphurized oil shows no sulphur, or at most no more than a qualitative trace of sulphur, present. Analysis of the by-product desulphurizing agent, after being separated from the desulphurized oil, on the other hand, shows that the same contains practically all, or all, of the sulphur which originally was introduced into the oil. Less than 0.02% by weight of sulphur should remain in the oil after desulphurization.

1. The analytical data given above for tung oil which has been treated by my process indicates the great changes which have occurred during the processing, and these changes are probably responsible for the unique character of the oil which has been produced.

2. The modified tung oil may be heated to 285° C., the jelling point of ordinary tung oil, for a period of over one hour without showing jelling.

3. The modified tung oil apparently does not give off any substantial amount of combustion products during the drying period, thus indicating its resistance to auto-oxidation.

4. It is extremely resistant to alkali, whereas ordinary oils are readily saponified by the latter.

5. It is to a marked extent insoluble in acetone, which latter is a solvent for almost all oils.

6. Its drying time is especially interesting: in the presence of a small amount of cobalt, for instance, a thin film of it will dry in a period of about six hours to a tough, elastic surface. The drying is apparently not a mere surface drying but a honeycomb type of drying. The oxidation or polymerization of such a film in the presence of air is apparently confined to an induction period of less than 24 hours, after which time oxidation discontinues. That is to say, after an initial oxidation period of 24 hours or less practically no further oxygen is absorbed by the film, and it is probable that no combustion products are given off. This would lend strength to the theory that in the initial induction or jelling period a "honeycomb" formation develops, in the midst of which "honeycomb" may be permanently plastic gels which never become hard or brittle solids. This view would explain why oils of this character are so very much more durable than any tung oil product produced heretofore. As an instance, very light tints of blue and green paints made with this oil have shown at least 100% greater tint retention and durability than similar paints made with the same pigment mixtures but with ordinary linseed oil or the ordinary tung oil (raw or processed).

7. The modified oil shows materially less "yellowing" tendency when aged in a film than does the unmodified oil.

The invention is not, however, limited to a treatment of tung oil, it being possible by the process of the invention to confer new and very desirable properties upon other drying and semi-drying oils of animal and vegetable origin including linseed, soybean, menhaden, perilla, safflower and poppy seed oils. In practice I prefer to employ one or more of the latter in conjunction with tung oil, e. g., 80 parts of tung oil and 20 parts of, say, linseed oil, or at least 50 parts of tung oil and not more than 50 parts of another of the oils mentioned.

Nor is the invention restricted to the employment of the relative amounts of reactants suggested in the above-given examples, it being the essence of the present invention that a drying oil is heated with a relatively very small amount (i. e., from 0.04% to 0.20%) of sulphur, selenium, a sulphur-yielding agent or a selenium-yielding agent to reacting temperature, and thereafter reacting upon the resulting complex with an agent adapted to abstract the sulphur, or the selenium, from combination with the oil. The sulphurizing or "seleniumizing" agent is usually to be used in a relatively very small amount with respect to the oil the amount of the agent being of the order of from 0.04% to 0.20% based on the oil. The specific temperature mentioned (290° C.) may likewise be departed from within reasonable limits, it being observed that the oil and the reactant must be raised to an elevated temperature to promote the desired reaction.

By the expression "sulphurization agent" as used in the appended claims I mean to include elemental sulphur and, as well, a sulphur-bearing organic compound which is capable of yielding sulphur reaction products when heated with oils. By "bodying agent" as used in the appended claims I mean to include the above-defined sulphurizing agent and, as well, elemental selenium and selenium-bearing organic compounds. By the expression "a drying oil" as used in the appended claims I mean an animal or vegetable oil having an iodine value of from 130 to 200.

I claim:

1. Process of preparing a liquid oily product which is adapted, in the presence of a drier, to dry to a non-tacky surface, which comprises heating a drying oil with a relatively small amount of an agent of the group consisting of elemental sulphur, elemental selenium and organic compounds of said elements, at reacting temperature, and thereafter reacting the so-treated oil with an agent of the group consisting of heavy metals and heavy metal oxides adapted to decompose the resulting modified oil with liberation of the first named agent, and the formation of an oil in which the content of the first named agent is reduced to less than .02% by weight.

2. Process as defined in claim 1, in which the oil undergoing the defined treatment is tung oil.

3. Process of preparing a liquid oily product which is adapted, in the presence of a drier, to dry to a non-tacky surface, which comprises heating a drying oil with from about 0.04% to about 0.20% by weight of a sulphurizing agent at an elevated temperature approximating 290° C., and thereupon treating the resulting reaction product with a relatively small amount of a desulphurizing agent of the group consisting of heavy metal oxides and heavy metals, with heating reaction temperatures whereby to reduce the sulphur content of the oil to less than 0.02% by weight.

4. Process as defined in claim 3, in which the the desulphurizing agent is metallic copper.

5. Process as defined in claim 3, in which the desulphurizing agent is spun metallic copper, and in which clarification is effected by separating the spun metallic copper from the oil.

6. Process as defined in claim 3, in which the desulphurizing agent is zinc oxide.

7. Process as defined in claim 3, in which the drying oil is tung oil.

8. A bodied drying oil product containing sulphur in an amount less than about 0.02% by weight, said product being capable of being heated at 285° C. for 15 minutes without solidification, said product being additionally characterized as compared with the untreated oil by a reduced iodine number and increased specific gravity and viscosity, by being difficultly saponifiable by means of alkali and by being substantially insoluble in acetone.

9. A bodied tung oil product containing sulphur in an amount less than about 0.02% by weight and having a viscosity greater than that of the untreated tung oil and which is capable of being heated at 285° C. for 15 minutes without jelling, said product being additionally characterized as compared with untreated tung oil, by a reduced iodine number, by an increased specific gravity, by a refractive index of approximately 1.500, by being only difficultly saponifiable by means of alkali, and by being substantially insoluble in acetone.

10. A bodied tung oil product derived by sulphurization of tung oil followed by substantial desulphurization thereof to less than 0.02% by weight of combined sulphur, said bodied tung oil being capable of being heated to 285° C. for 15 minutes without solidification, and being characterized by a viscosity greater than that of the tung oil before treatment, an iodine number of about 125, a specific gravity of approximately 1.500, by being only difficultly saponifiable by means of alkali, by being substantially insoluble in acetone, and by the fact that said bodied oil in the presence of cobalt dries to a tough elastic film in a period of about 6 hours, which film is substantially non-oxidizable in air after an induction period of not to exceed 24 hours.

11. A bodied oily product which is adapted, in the presence of a drier, to dry to a non-tacky surface, said product comprising a bodied oil consisting essentially of a bodied tung oil product containing sulphur in an amount less than 0.02% by weight, said tung oil product being obtained by carrying out the process defined in claim 1, said bodied oil containing a pigment dispersed therein.

12. Process of bodying a drying oil and simultaneously pigmenting the same, which comprises heating the drying oil with from about 0.04% to about 0.20% by weight of a sulphurizing agent at an elevated temperature approximating 290° C. and treating the resulting hot reaction product with finely divided zinc oxide, at reacting temperature, whereby to convert at least a portion of the zinc oxide to zinc sulphide.

HENRY A. GARDNER.